United States Statutory Invention Registration [19]

Finken

[11] Reg. Number: H605

[43] Published: Mar. 7, 1989

[54] MULTI-ELEMENT ADAPTIVE ANTENNA ARRAY

[75] Inventor: Kenneth R. Finken, Indialantic, Fla.

[73] Assignee: The United States of America as represented by the Secretary of the Air Force, Washington, D.C.

[21] Appl. No.: 824,994

[22] Filed: Feb. 3, 1986

[51] Int. Cl.[4] ..... H01Q 21/00; H01Q 3/22

[52] U.S. Cl. ..... 343/853; 342/368

[58] Field of Search ..... 343/771, 756, 777, 853, 343/844, 893, 725; 342/363–366, 378, 379

[56] References Cited

U.S. PATENT DOCUMENTS

| | | | |
|---|---|---|---|
| 2,928,087 | 3/1960 | Parker | 343/106 |
| 3,854,140 | 12/1974 | Ranghelli et al. | 343/756 |
| 3,864,687 | 2/1975 | Walters et al. | 343/778 |
| 3,967,276 | 6/1976 | Goubau | 343/752 |
| 4,246,585 | 1/1981 | Mailloux | 343/854 |
| 4,259,670 | 3/1981 | Schiavone | 343/700 MS |
| 4,260,994 | 4/1981 | Parker | 343/854 |
| 4,318,107 | 3/1982 | Pierrot et al. | 343/840 |
| 4,431,998 | 2/1984 | Finken | 343/797 |
| 4,466,003 | 8/1984 | Royce | 343/826 |
| 4,489,331 | 12/1984 | Salvat et al. | 343/789 |
| 4,543,579 | 9/1985 | Teshirogi | 342/365 |
| 4,626,858 | 12/1986 | Copeland | 342/363 |
| 4,628,321 | 12/1986 | Martin | 342/379 |
| 4,649,391 | 3/1987 | Tsuda et al. | 343/789 |

*Primary Examiner*—Stephen C. Buczinski
*Assistant Examiner*—Linda J. Wallace
*Attorney, Agent, or Firm*—William G. Auston; Donald J. Singer

[57] ABSTRACT

A phased array antenna is disclosed including a central reference element. This is surrounded by a plurality of sub-elements which form the adaptive elements of the array and have no feed networks. Each adaptive element is essentially an "L" stub, with the adaptive elements oriented such that the "L" top loading is circumferential around the reference element. The plurality of adaptive elements, all with different orientations of the linear top loading allows the complex weights and adaptive nulling algorithm to generate any required polarization, and form an adaptive null to any arbitrary polarized interferring signal as required.

1 Claim, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MULTI-ELEMENT ADAPTIVE ANTENNA ARRAY

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to phased array antenna systems and more particularly to a multi-element adaptive antenna array designed to decrease mutual coupling between the antenna elements.

The Global Positioning System (GPS) includes a plurality of GPS satellites which transmit L band radio frequency (RF) signals that provide a geodetic reference to recipients. The GPS system requires full hemispherical coverage and receiving antennas should have elements designed to provide enhanced low angle coverage close to the horizon. When this type of element is used in an adaptive array of identical elements, this low angle coverage results in substantial coupling between the reference element and the adaptive elements. The adaptive elements are essentially resistively terminated with the resistive loads in the hybrid feed network and the low noise amplifier input impedance. The high mutual coupling between the reference element and terminated adaptive elements results in signal loss to the reference element.

This loss of signal could be rectified to some extent by moving the adaptive elements further from the reference element. However, this approach has two main disadvantages. The larger spacing could cause potential spurious nulls in the adaptive mode, and more important, it results in a larger, (and heavier) array that might not fit in the allocated space where space is limited.

The task of providing a multi-element adaptive antenna array with reduced mutual coupling is alleviated, to some degree, by the following U.S. Patents, which are incorporated herein by reference:

U.S. Pat. No. 2,928,087 issued to Parker on 8 Mar. 1960;

U.S. Pat. No. 3,967,276 issued to Goubau on 29 Jan. 1976;

U.S. Pat. No. 4,246,585 issued to Mailloux on 20 Jan. 1981;

U.S. Pat. No. 4,259,670 issued to Schiavone on 31 Mar. 1981;

U.S. Pat. No. 4,260,994 issued to Parker on 7 April 1981;

U.S. Pat. No. 4,466,003 issued to Royce on 14 Aug. 1984; and

U.S. Pat. No. 4,431,998 issued to Finken on 14 Feb. 1984.

Parker U.S. Pat. No. 2,928,087 shows an omnidirectional beacon antenna having small height and diameter but with good gain in all directions. It includes a central radiating element and rotating elements, with coupling means including a transmission line to each rotating element. Parasitic modulating elements are spaced less than three half wavelengths from the center and the preferred number of them is nine. They may be quarter or half wave elements.

Goubau shows a four element antenna with top capacitor plates and printed circuit versions of having a central element and surrounding quarter wave conductors. In Parker U.S. Pat. No. 4,260,994 a plurality of arrays of parasitic antenna elements are used to synthesize and shape radiation patterns. Mailloux discloses adaptive nulling with an antenna array and Schiavone is directed to a broadband microstrip antenna.

The Finken patent discloses a GPS reference element composed of four sub-elements fed in phase rotation. A seven element adaptive array used seven of those reference type elements, each with four sub-elements. The center element in the seven element array was used as a reference element and the six identical elements surrounding it were used as adaptive elements. This configuration results in high mutual coupling between the reference element and the six adaptive elements with an associated loss in gain in the center reference element. This coupling reduces the efficiency of the center element when energy which should be received by it, is received by a neighboring element.

A possible solution to the mutual coupling phenomenon is to simply provide more spacing between the elements. However, in a variety of applications, this solution is not acceptable. For example, a limited amount of space is available for airborne conformal element arrays, and increased surface areas are not always available.

In view of the foregoing discussion it is apparent that there currently exists the need to reduce the mutual coupling experienced between antenna elements without significantly increasing the size of the antenna array. The present invention is intended to satisfy that need.

SUMMARY OF THE INVENTION

The present invention is a conformal element array antenna which, in one embodiment, is designed to receive Global Positioning System signals from GPS satellites while reducing mutual coupling between the antenna elements.

The preferred embodiment is a seven element array which uses one center element, called a reference element, surrounded by six adaptive elements. In a previous design, an array composed of seven identical reference elements (each being a four sub-element reference element) occasioned a susceptability to mutual coupling wherein energy normally received by the center reference element was received by the other elements on the perimeter of the array. The result of mutual coupling is that the efficiency of the center reference element is reduced.

Prior art array antennas are predominantly composed of a plurality of identical elements. In the present invention, the reference element differs from the adaptive elements in that each adaptive element is a single sub-element, while the reference element is composed of four sub-elements. The selection of a suitable sub-element can be made from any member of the group of asymmetrically top loaded stubs, unbalanced slots, "L" type stubs, "U" shaped slots, or other types of unbalanced elements known in the art and described in the Finken reference.

It was determined that these sub-elements by themselves, without the need for the feed networks, would adequately perform as the adaptive elements in the array. Mutual coupling between these adaptive sub-elements and the reference element is greatly reduced resulting in less loss and greater gain for the reference element. This reduced coupling results, in part, from the greater spacing in the same overall size permitted by the smaller adaptive elements. Also, the absence of adaptive element feed networks and their hybrid terminations reduces the ohmic losses of the reference element associated with the reduced adaptive element coupling.

Additionally, mutual coupling is reduced in the preferred embodiment in that the reference element tends to be polarized in the opposite sense from the adaptive elements. Although both the reference element and the adaptive elements tend to be polarized perpendicular to the common ground plane, slightly above the ground plane the reference element is right hand elliptically polarized. The adaptive elements are oriented so that they are left hand elliptically polarized in the direction of the reference element and exhibit the desired right hand elliptically polarization out from the array.

It is a principal object of the present invention to provide a conformal element array with reduced coupling between the elements.

It is another object of the present invention to reduce coupling between the elements of an array without significantly increasing the size of the array.

It is another object of the present invention to reduce mutual coupling in an array of elements by using elements which are not all identical with each other.

It is another object of the present invention to reduce mutual coupling between antenna elements by using elements which are polarized differently from each other.

These together with other objects features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes a conformal element array designed to reduce mutual coupling between the elements.

Figure 1:
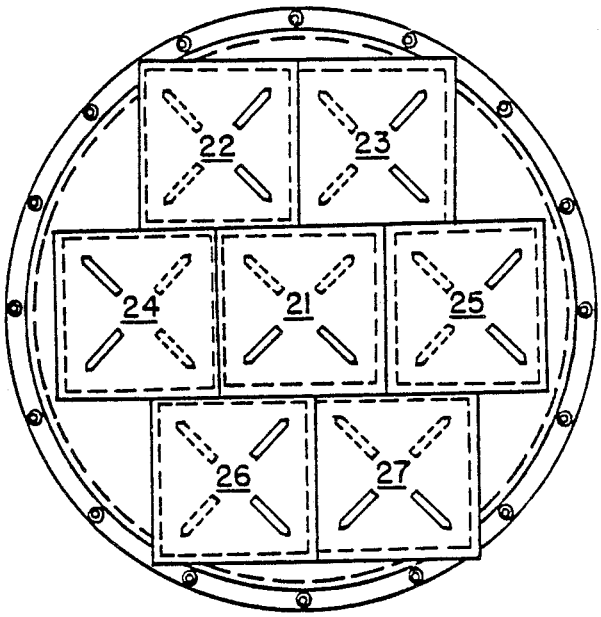
FIG. 1 PRIOR ART
FIG. 1 is an exploded view of a prior art antenna composed of seven identical elements.

The reader's attention is directed to FIG. 1, which illustrates the prior art antenna containing seven identical elements 21–27 fixed in an array which permitted conformal mounting to an aircraft fuselage. Each of the elements 21–27 contain four diagonally oriented "L" type sub-elements, and are similar to the reference element of the Finken reference.

One of the uses planned for the antenna of FIG. 1 includes the reception of Global Positioning System L band radio frequency signals. As mentioned above, the GPS system requires full hemispherical coverage and receiving antennas should have elements designed to provide enhanced low angle coverage close to the horizon. When this type of element is used in an adaptive array of identical elements, this low angle coverage results in substantial coupling between the reference element and the adaptive elements. The adaptive elements are essentially resistively terminated with the resistive loads in the hybrid feed network and the low noise amplifier input impedance. The high mutual coupling between the reference element and terminated adaptive elements results in signal loss to the reference element.

This loss in signal could be rectified to some extent by moving the adaptive elements further from the reference element. However, this approach has two main disadvantages. The larger spacing could cause potential spurious nulls in the adaptive mode, and more important, it results in a larger, (and heavier) array that does not fit in the allocated space on the aircraft.

A conventional adaptive antenna array consists of multiple similar antenna elements, a set of complex weights and combiner to adjust the amplitude and phase of each element of the array, and a controller and proper algorithm to control these weights to provide proper null steering and anti-jam capability. The adaptive elements are normally terminated in a low noise amplifier or the adaptive weights themselves, and the adaptive antenna ports are not open-circuited at the radiating structure itself.

Figure 2:
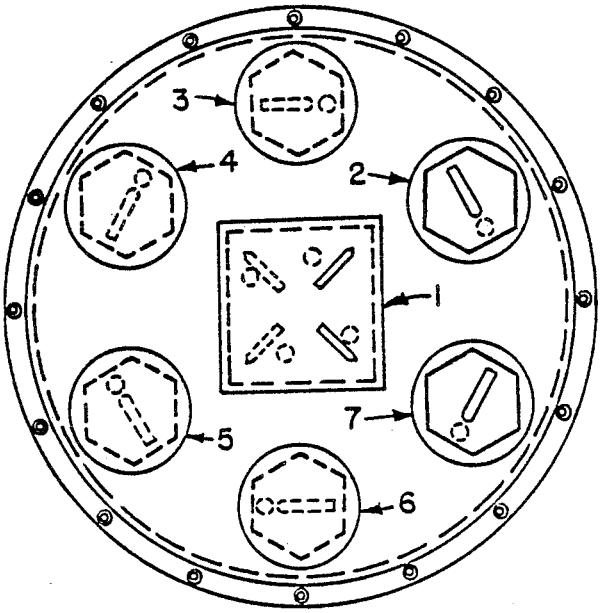
FIG. 2 is a schematic of the present invention.

An alternative to enlarging the conventional antenna array, which would put more space within a grouping of similar elements, is the present invention. FIG. 2 is a schematic of one embodiment of the present invention. This embodiment is a seven element conformal element array which would have the same application as the array of FIG. 1.

The seven element array of FIG. 2 contains a central reference element 1 surrounded by a grouping of six adaptive elements 2–7. This reference element 1 is composed of four sub-elements, which are supported by a feed network. Each sub-element is a single asymmetrically top loaded stub selected from a group consisting of: unbalanced slots, "L" type stubs, "U" shaped slots, and other types of unbalanced elements known in the art and described in the Finken reference. FIG. 2 depicts a reference element with four diagonally oriented "L" type sub-elements. A hybrid feed network with loads on the unused ports is required to feed this reference element. The six elements surround the reference element. They consist of one "L" type element each, very similar to one sub-element of the main reference element. The adaptive elements are oriented circumferencially around the reference element with the "L" type top loading extending in a counter-clockwise direction (when viewed from the top) in order to achieve the proper sense of elliptical polarization.

Each of the adaptive elements 2–7 are composed of a single sub-element. In one embodiment of the invention, these sub-elements performed as the adaptive elements without the feed network described in the Finken reference. Mutual coupling between these adaptive sub-elements and the reference element is greatly reduced resulting in less loss and greater gain for the reference element. This reduced coupling results, in part, from the greater spacing in the same overall size permitted by the smaller adaptive elements. Also, the absence of adaptive element feed networks and their hybrid terminations reduces the ohmic losses of the reference element associated with the reduced adaptive element coupling.

Figure 3:
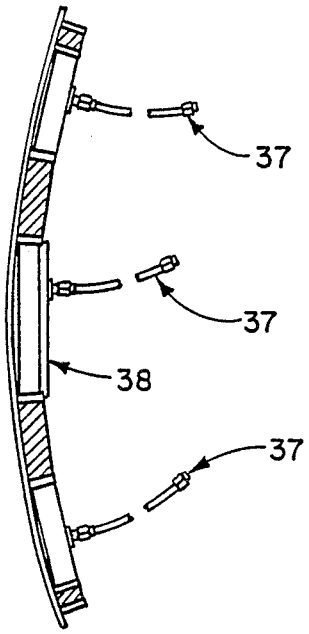
FIG. 3 is a side view of the schematic of FIG. 2.

FIG. 3 is a schematic of the side view of the array of FIG. 2 which illustrates a feed network used to support the elements of the array. As illustrated in FIG. 3, cable and connector 37 feeds signals to the adaptive elements.

Each adaptive element has its own connector. Note that there is no corporate feed network feeding the adaptive elements per se. Each adaptive element is connected to an operational amplifier and a complex weight which adjusts both the phase and amplitude of the signal from that element in accordance with the commands from the controller and associated algorithm. Only then is the signal combined with the signal from the reference element to form the adaptive null. Each of the adaptive elements has a similar chain of equipment and processing to form additional nulls (or increase the angular sector and/or bandwidth of a particular null).

Each adaptive element alone has some degree of elliptical polarization by virtue of the asymmetric radiating structure. The sense of the elliptical polarization is opposite on each side of the plane of symmetry, and the adaptive elements are oriented so that they tend to be of opposite sense of elliptical polarization in the inward direction toward the reference element and the correct sense in the outward direction toward the interfering sources.

Figure 7:
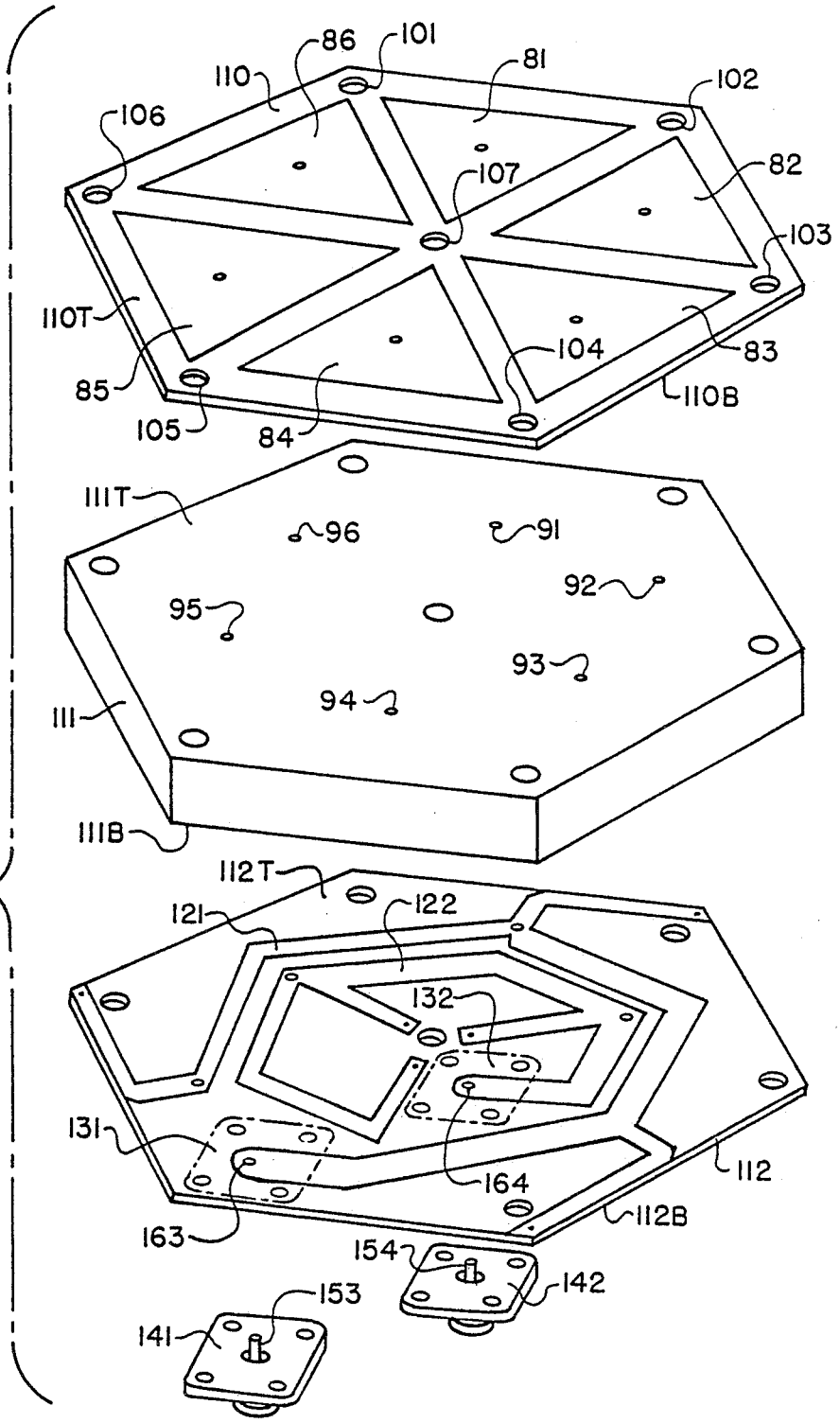
FIG. 7 PRIOR ART
FIG. 7 is an illustration of a prior art feed network in a circularly polarized antenna.

At zenith and high elevation angles, the multitude of adaptive elements with various orientations allow the processor to adjust the amplitude and phase of each adaptive element to form any sense of elliptical or circular polarization, and generate an adaptive null for any polarization. In the embodiment of the invention, a reference element feed network 38, feeds signals to the reference element with a polarization which is opposite that of the adaptive elements. An example of a circuit which can serve as the reference element feed network 38 of FIG. 3 is illustrated and described in the above-identified Finken patent, which was incorporated herein by reference. FIG. 7 is from the Finken reference, and illustrates a circularly polarized hemispheric coverage antenna with two sets of asymetrical, top-loaded elements 81–86, which are separated by a space 111, from their impedance matching and phase delay network 121 and 122. Although only four sub-elements are used in the described reference element of the present invention, any number of sub-elements greater than or equal to three may be used to generate circular polarization. The feed network described in the Finken patent provides circular polarization for up to six elements. This control of polarization is known in the art, and is also described in the Finken reference, and need not be redescribed here. Further elaboration on methods of obtaining circular polarization is described in such standard texts as "Antenna Engineering Handbook" by Henry Jasik, and published by the McGraw Hill Book Company in 1961. An entire chapter in the text is devoted to providing circular polarization to antenna systems.

The reference element feed network generates right hand circular polarization which is dictated by the GPS satellite transmission. The opposite sense elliptical polarization of the adaptive elements is generated by orienting the top loading of the L type elements in a counterclockwise direction (viewed from the top) around the reference element.

The reference element itself forms the desired circular polarization by virtue of its multiple sub-elements and its integral feed network. Although four sub-elements are used in the described reference element, any number of sub-elements greater than or equal to three may be used to generate circular polarization providing the proper reference feed network is used.

Likewise any arbitrary number of adaptive elements may be used (each with its own set of complex weights). In order to generate circular polarization at zenith at least two adaptive elements of the type discussed must be used and they must be oriented in different directions relative to each other.

It was found that the mutual coupling between the reference element and the adaptive elements was further reduced when the reference element was polarized with right hand elliptical polarization, while the adaptive elements were polarized in left hand elliptical polarization. This control of polarization is known in the art, and described in the Finken reference. This practice, for an array of (N=three or more) elements entails feeding the elements in phase rotation (i.e., 360°/N phase difference between elements) to provide circular polarization.

Figure 4:
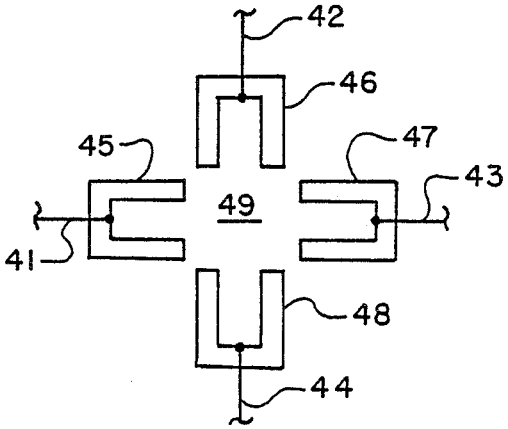
FIG. 4 depicts an embodiment of the reference element of FIG. 2.

FIG. 4 depicts an embodiment of a reference element composed of four cirularly polarized U-shaped slots 45–48. Similar to the design for adaptive elements in the Finken reference, each of these U-shaped slots are cut out in a metallic or conductive plane 49. The feed wires 41–44 are coupled to an edge of the conductive plane 49 opposite to the bottom of each respective U-shaped slot 45–48. Whether the reference element is an "L" shaped stub or a U-shaped slot, coupling is further reduced when the feed of the reference elexents polarized them in the opposite direction as that of the adaptive elements.

Figure 5:
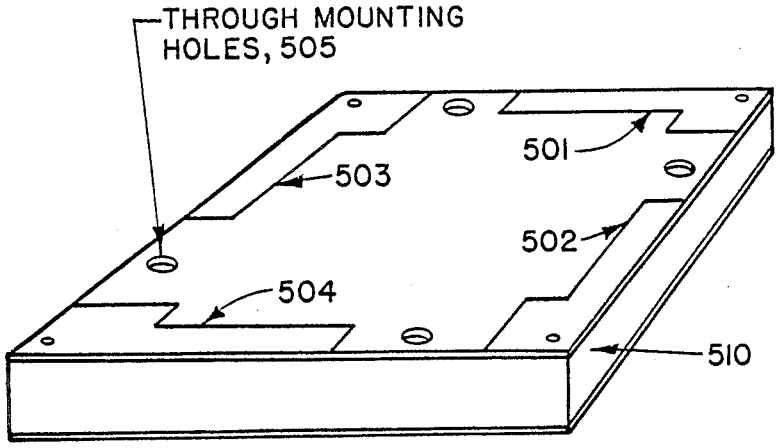
FIG. 5 depicts four "L" type sub-elements mounted together.
Figure 6:
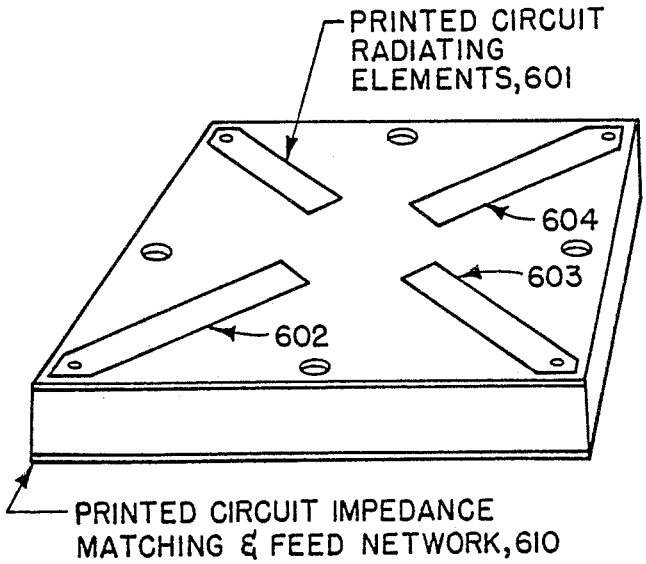
FIG. 6 depicts a detailed view of a single reference element used in FIG. 2.

FIG. 5 is an illustration of four "L" shaped elements 501–504 mounted together on a printed circuit impedance matching feed network 510. FIG. 6 is a detailed illustration of the reference element of FIG. 2. The reference element has four printed circuit radiating elements 601–604 mounted on a printed circuit impedance matching feed network 610.

The reference element (for GPS applications) must be right hand circular (elliptical) polarized everywhere in the hemisphere. It is desired that the adaptive elements also be the same sense of polarization looking away from the antenna. With identical reference and adaptive elements they must, by similarity, have the same sense of polarization looking at each other and hence, higher mutual coupling. The single sub-element adaptive element has opposite sense of elliptical polarization on each side of its plane of symmetry Consequently it is possible for this element to have the desired sense of polarization looking away from the antenna, and the opposite sense of polarization looking toward the reference element. This is hard to implement because both the reference and adaptive elements tend to be vertically polarized in the vicinity of a metallic ground plane. However, slightly above the ground plane, they both become elliptically polarized with the opposite sense of circularity, and this effect tends to reduce the mutual coupling.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A multi-element adaptive antenna array comprising:

a plurality of adaptive elements which are spaced apart from each other and which are polarized with left hand elliptical polarization; and a reference element which is centrally located in said antenna array and which is surrounded by said plurality of adaptive elements, said reference element comprising four "L" shaped stub sub-elements which are placed in proximity with each other, and which are polarized with right hand elliptical polarization to reduce their mutual coupling with said adaptive elements.

* * * * *